(12) United States Patent
Toda et al.

(10) Patent No.: US 8,388,228 B2
(45) Date of Patent: Mar. 5, 2013

(54) SLIDING BEARING USED IN TURBOCHARGER OF INTERNAL COMBUSTION ENGINE

(75) Inventors: Kazuaki Toda, Inuyama (JP); Shinji Ochi, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 176 days.

(21) Appl. No.: 13/037,516

(22) Filed: Mar. 1, 2011

(65) Prior Publication Data

US 2011/0211781 A1  Sep. 1, 2011

(30) Foreign Application Priority Data

Mar. 1, 2010  (JP) ................................ 2010-044753

(51) Int. Cl.
*F16C 33/06* (2006.01)
(52) U.S. Cl. ...................................... 384/276; 384/913
(58) Field of Classification Search .................. 384/276, 384/912, 913
See application file for complete search history.

(56) References Cited

U.S. PATENT DOCUMENTS

| | | | |
|---|---|---|---|
| 4,676,848 A | | 6/1987 | Ruchel et al. |
| 5,282,908 A | * | 2/1994 | Nakashima et al. .......... 148/434 |
| 5,296,057 A | * | 3/1994 | Baba et al. .................... 148/436 |
| 5,346,668 A | * | 9/1994 | Tanaka et al. ................. 420/485 |
| 2003/0026715 A1 | * | 2/2003 | Ojima et al. .................. 417/407 |
| 2004/0136860 A1 | * | 7/2004 | Fujita et al. ................... 420/482 |
| 2007/0266808 A1 | * | 11/2007 | Kanemitsu et al. ............... 74/60 |

FOREIGN PATENT DOCUMENTS

| | | |
|---|---|---|
| EP | 1 281 838 A1 | 2/2003 |
| EP | 2 009 122 A1 | 12/2008 |
| GB | 1103418.8 A1 | 2/1968 |
| JP | 61117240 A | 6/1986 |
| JP | 2003-42145 A | 2/2003 |

OTHER PUBLICATIONS

Search Report dated Jun. 8, 2011, issued in Patent Appln No. GB1103418.8.

* cited by examiner

*Primary Examiner* — Thomas R Hannon
(74) *Attorney, Agent, or Firm* — Browdy and Neimark, PLLC

(57) ABSTRACT

Disclosed is a sliding bearing used in turbochargers of internal combustion engines. It is formed with a copper alloy containing, by mass %, 25 to 45% Zn, 0.3 to 2.0% Si, 1.5 to 6.0% Mn, and the balance being Cu and unavoidable impurities. The sliding bearing has a cylindrical shape for supporting a rotating shaft. Crystallized Mn—Si compounds are dispersed in a matrix of the copper alloy, the compounds extending in an axial direction of the rotating shaft on a sliding surface of the sliding bearing. The crystallized Mn—Si compounds have an average inter-grain distance of 20 to 80 μm. The matrix may contain precipitated Mn—Si compounds as well as the crystallized Mn—Si compounds.

8 Claims, 2 Drawing Sheets

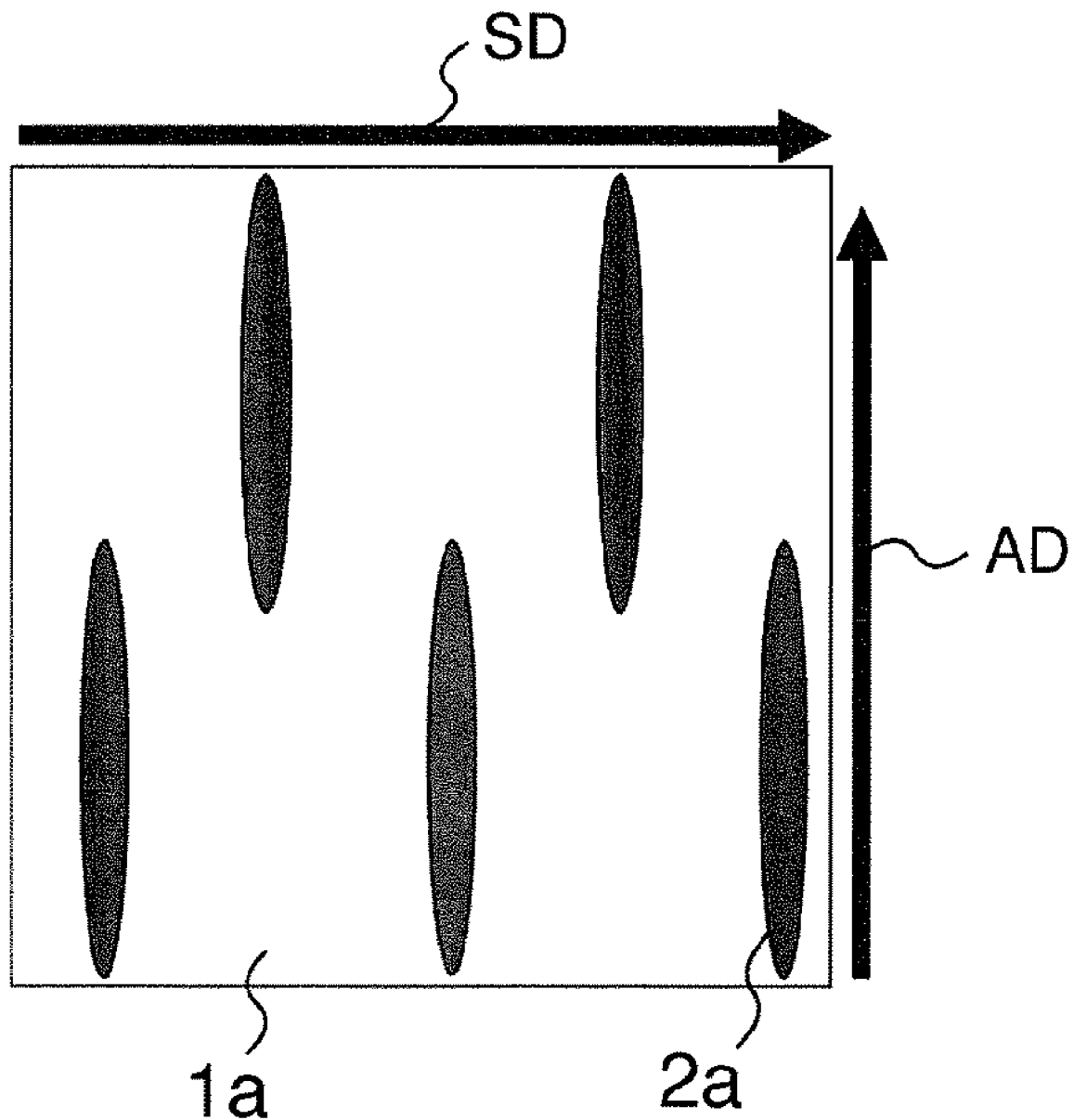

SLIDING BEARING USED IN TURBOCHARGER OF INTERNAL COMBUSTION ENGINE

CROSS-REFERENCE TO RELATED APPLICATIONS

The present application claims priority from Japanese Patent Application JP-2010-44753 filed on Mar. 1, 2010, the content of which is hereby incorporated by reference into this application.

TECHNICAL FIELD

The present invention relates to a sliding bearing excellent in anti-seizure property suitable for turbochargers of internal combustion engines.

BACKGROUND ART

Conventionally, the sliding bearing used in turbochargers of internal combustion engines has been required to have corrosion resistance and wear resistance properties, and it has been made of brass in which grains of Mn—Si compounds are dispersed in a matrix of the brass. There has been proposed such a sliding bearing in JP-A-2003-42145, according to which an extension direction of crystallized Mn—Si compounds crystallized in brass is arranged to correspond to an axial direction of a rotating shaft to be supported by the sliding bearing on a sliding surface of the sliding bearing. The technique disclosed in JP-A-2003-42145 is schematically illustrated in FIG. 3 (in which SD denotes a sliding direction and AD an axial direction, crystallized Mn—Si compounds 2a are dispersed in a copper alloy matrix 1a). Depending on the direction of the crystallized Mn—Si compounds, an effect can be obtained, which effect is improvement of the wear resistance property of the sliding bearing.

With regard to the technique disclosed in JP-A-2003-42145, however, it was confirmed that in respect of the crystallized Mn—Si compounds, which exist on the sliding surface of the sliding bearing, and which extend to the axial direction of the rotating shaft, the larger the grain size (i.e. an extension length) increases, the more the wear resistance property is improved while the anti-seizure property is deteriorated.

During operation of the turbocharger of the internal combustion engine, the bearing use environment becomes a high temperature and the viscosity of lubricant oil drops. In the case where the oil viscosity excessively drops, an enough oil film is not formed in a clearance between the sliding surface of the sliding bearing and a mating shaft resulting in that both the sliding surfaces of the sliding bearing and the mating shaft are caused to directly contact. The sliding bearing disclosed in JP-A-2003-42145 has a disadvantage in that a sulfide film is hard to be formed on a surface of a brass matrix in the sliding surface of the sliding bearing, thus causing a contact of metals between the brass matrix and the mating shaft and thereby decreasing the anti-seizure property.

BRIEF SUMMARY OF THE INVENTION

In light of the above considerations, the present invention was proposed.

An object of the present invention is to provide a sliding bearing excellent in anti-seizure property, which is used in turbochargers of internal combustion engines.

Under the above object, according to the present invention, there is provided a sliding bearing used in turbochargers of internal combustion engines, which is formed with a copper alloy comprising, by mass, 25 to 45% Zn, 0.3 to 2.0% Si, 1.5 to 6.0% Mn, and the balance being Cu and unavoidable impurities, and which has a cylindrical shape for supporting a rotating shaft, wherein crystallized Mn—Si compounds, which extend in an axial direction of the rotating shaft on a sliding surface of the sliding bearing, are dispersed in a matrix of the copper alloy, and wherein the crystallized Mn—Si compounds have an average inter-grain distance of 20 to 80 µm.

According to a first embodiment of the present invention, the matrix of the copper alloy contains not only the crystallized Mn—Si compounds but also precipitated Mn—Si compounds which are dispersed in the matrix, and the Mn—Si compounds including the crystallized Mn—Si compounds and the precipitated Mn—Si compounds have an average inter-grain distance of 5 to 30 µm.

According to a second embodiment of the present invention, the copper alloy further comprises, by mass %, at least one element selected from the group consisting of Fe, Al, Ni, Sn, Cr, Ti, Mo, Co, Zr and Sb in a total amount of not more than 5%.

According to a third embodiment of the present invention, the copper alloy further comprises at least one element selected from the group consisting of Pb and Bi.

According to the invention sliding bearing, the crystallized Mn—Si compounds extending in the axial direction of the rotating shaft on the sliding surface of the sliding bearing are dispersed in the alloy matrix. The crystallized Mn—Si compounds consist of five Mn atoms and three Si atoms, and are dispersed in a form of acicular grains in the alloy matrix. With regard to the above recitation that the crystallized Mn—Si compounds, existing on the sliding surface of the sliding bearing, extend in the axial direction of the rotating shaft, as shown in FIG. 1, it means that major axes of the crystallized acicular Mn—Si compounds extend in the axial direction of the rotating shaft on the sliding surface of the sliding bearing. By such an orientational arrangement of the crystallized acicular Mn—Si compounds, the wear resistance property of the sliding bearing is improved. Note that according to one aspect of the present invention, the crystallized Mn—Si compounds may be arranged to be oriented to the axial direction of the rotating shaft on the sliding surface of the sliding bearing at least on the sliding surface of the sliding bearing, while such an arrangement is not peculiar to the present invention and an obtainable technical effect thereby is disclosed in JP-A-2003-42145. Thus, a detailed description is omitted herein. Note also that it was experimentally confirmed that the crystallized Mn—Si compounds having an average longitudinal length (i.e. the average size of the major axes) of less than 10 µm loses the effect of improving the wear resistance property of the sliding bearing. Thus, the sliding bearing according to the aspect of the present invention requires the crystallized Mn—Si compounds to have an average longitudinal length (i.e. an average size of the major axes) of not less than 10 µm.

In the sliding bearing in which crystallized Mn—Si compounds are dispersed in the copper alloy matrix, when a temperature of the copper alloy rises during operation of the turbocharger, there will arise a difference in thermal expansion between the copper alloy matrix and the crystallized Mn—Si compounds thereby causing lattice defects (i.e. lattice strain) in an arrangement of the metal atoms forming the copper alloy matrix around the Mn—Si compounds. The copper alloy matrix with such lattice defects is in an active state and liable to react with sulfur contained in lubricant oil.

In the invention sliding bearing, the crystallized Mn—Si compounds dispersed in the copper alloy matrix have an average inter-grain distance of 20 to 80 μm, according to which arrangement of the crystallized Mn—Si compounds, the entire copper alloy matrix on the sliding surface of the sliding bearing is affected by the difference in thermal expansion between the copper alloy matrix and the crystallized Mn—Si compounds, so that the copper alloy matrix is uniformly active and a sulfide film can be formed early on a surface of the copper alloy matrix. Herein, the average inter-grain distance means an average value of the distance (d: see FIG. 1) between a surface of a grain of the Mn—Si compound in the copper alloy matrix and a surface of another grain of the Mn—Si compound closest to the former grain, and expresses an average length of the copper alloy matrix existing between both the adjacent Mn—Si compound grains. Since the invention sliding bearing has a feature that the crystallized Mn—Si compounds, extending in an axial direction of the rotating shaft on the sliding surface of the sliding bearing, are dispersed in the copper alloy matrix, and the crystallized Mn—Si compounds have an average inter-grain distance of 20 to 80 μm, when the turbocharger is operating, a nonmetallic sulfide film is formed in an early stage on the surface of the copper alloy matrix, thereby preventing occurrence of metal-to-metal sliding contact between the sliding bearing and the mating shaft to improve anti-seizure property of the sliding bearing.

It was experimentally confirmed that in the case of the crystallized Mn—Si compounds having the average inter-grain distance of less than 20 μm, the average longitudinal length (i.e. the average size of the major axes) is less than 10 μm. In this case, as set forth above, the improvement effect of wear resistance property of the sliding bearing is lost. In contrast to this, when the average inter-grain distance of the crystallized Mn—Si compounds exceeds 80 μm, the copper alloy matrix in or near a central region between Mn—Si compound grains is hardly affected by the difference in thermal expansion between the copper alloy matrix and the Mn—Si compounds during operation of the turbocharger, so that a sulfide film is hardly formed on a surface of the copper alloy matrix.

In the first embodiment of the invention, the matrix of the copper alloy contains not only the crystallized Mn—Si compounds but also precipitated Mn—Si compounds which are dispersed in the matrix. When casting the copper alloy, compounds of Mn and Si (i.e. the crystallized Mn—Si compounds) are crystallized in the molten copper alloy. When a cooling rate of the molten copper alloy is low, almost all of Mn and Si in the copper alloy are crystallized as the compounds. Thus, as shown in FIG. 1 in which SD denotes a sliding direction and AD an axial direction, the crystallized Mn—Si compounds 2 are dispersed in the copper alloy matrix 1. Contrasting, when the cooling rate of the molten copper alloy is higher, a part of Mn and Si in the copper alloy is dissolved oversaturatedly in the copper alloy matrix without crystallization to the Mn—Si compounds. Thus, as shown in FIG. 2 in which SD denotes a sliding direction and AD an axial direction, the precipitated Mn—Si compounds 3 are dispersed in the copper alloy matrix 1 among the crystallized Mn—Si compounds. The precipitated Mn—Si compounds in the invention copper alloy are relatively smaller than the crystallized acicular Mn—Si compounds, and are dispersed in a form of generally spherical grains, so that it is possible to make the average inter-grain distance of the Mn—Si compounds smaller since the precipitated Mn—Si compounds are dispersed in the copper alloy matrix between the crystallized Mn—Si compounds, while the spherical grains have not much effect on the wear resistance property. In this connection, it was experimentally confirmed that the dispersion state of the precipitated Mn—Si compounds can be controlled by setting appropriate casting conditions and conducting heat treatment.

In the first embodiment of the invention, the Mn—Si compounds including the crystallized Mn—Si compounds and the precipitated Mn—Si compounds have an average inter-grain distance of 5 to 30 μm. According to this feature, the entire copper alloy matrix of the sliding surface of the sliding bearing is liable to be affected by the difference in thermal expansion between the crystallized Mn—Si compounds and the precipitated Mn—Si compounds, so that a sulfide film can be formed in an early stage on the entire surface of the copper alloy matrix.

Further it was experimentally confirmed that when the average inter-grain distance of the Mn—Si compounds including the crystallized Mn—Si compounds and the precipitated Mn—Si compounds is less than 5 μm, the longitudinal length (i.e. a size of the major axes) of the crystallized Mn—Si compounds is less than 10 μm. This will be because in the case where the average inter-grain distance is intended to make smaller by increasing the number of precipitated Mn—Si compounds, it is needed to make a cooling rate of the molten copper alloy higher when casting thereby restraining the crystallized Mn—Si compounds from growing larger.

Zn is an element contributing to improvement of corrosion resistance property, so that the invention copper alloy comprises 25 to 45% Zn. In the case of less than 25% Zn, the copper alloy can not have satisfactory corrosion resistance property. In the case of more than 45% Zn, the copper alloy becomes brittle. More preferably, the Zn amount is in a range of 28 to 40%.

Si is an element which reacts with Mn to form a compound contributing to improving wear resistance property, so that the invention copper alloy comprises 0.3 to 2.0% Si. In the case of less than 0.3% Si, only a small amount of the Mn—Si compounds are formed, so that the copper alloy can not have satisfactory wear resistance property. In the case of more than 2.0% Si, an excessive amount of the Mn—Si compounds are formed, so that the copper alloy becomes brittle. More preferably, the Si amount is in a range of 0.6 to 1.4%.

Mn reacts with Si to form a compound contributing to improving wear resistance property, so that the invention copper alloy comprises 1.5 to 6.0% Mn. In the case of less than 1.5% Mn, only a small amount of the Mn—Si compounds are formed, so that the copper alloy can not have satisfactory wear resistance property. In the case of more than 6.0% Mn, the copper alloy becomes brittle. More preferably, the Mn amount is in a range of 2.0 to 4.0%.

In the second embodiment of the present invention, the copper alloy further comprises at least one element selected from the group consisting of Fe, Al, Ni, Sn, Cr, Ti, Mo, Co, Zr and Sb in a total amount of not more than 5%. These elements contribute to strengthening the copper alloy matrix. In the case of less than 0.1% of the element(s), the copper alloy has not such an effect. In the case of more than 5% of the element(s), the copper alloy becomes brittle. These elements may be combined with Mn and Si to form compounds. The crystallized Mn—Si compounds or the precipitated Mn—Si compounds in the invention alloy may be a compound(s) with one or more of these elements.

In the third embodiment of the present invention, the copper alloy may further comprise a total of not more than 5% of at least one element selected from Pb and Bi. In the case of less than 0.1% of the element(s), the copper alloy does not have such an effect. In the case of more than 5% of the element(s), the copper alloy becomes brittle.

BRIEF DESCRIPTION OF THE SEVERAL VIEWS OF THE DRAWINGS

FIG. 3 is a schematic drawing showing a sliding surface of a conventional sliding bearing, on which crystallized Mn—Si compounds are dispersed in the copper alloy matrix.

DETAILED DESCRIPTION OF THE INVENTION

EXAMPLE

Figure 1:
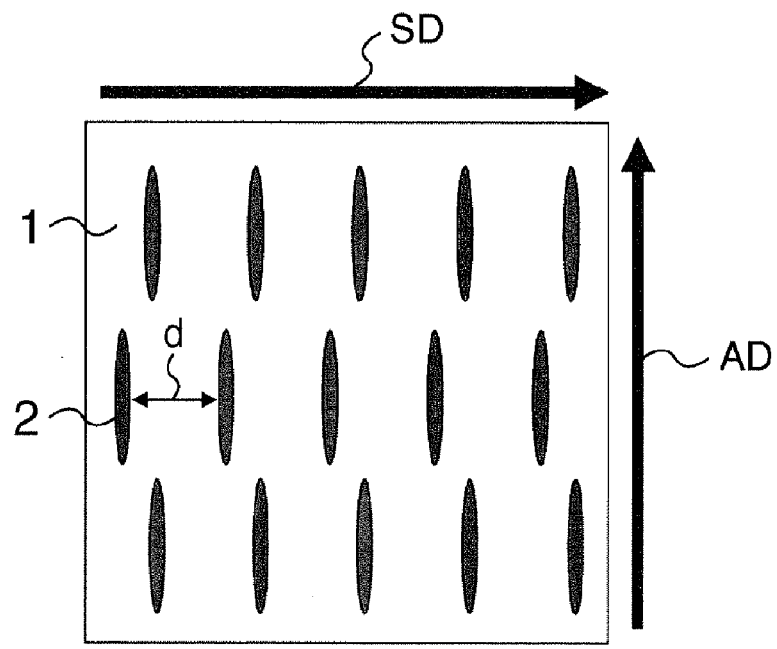
FIG. 1 is a schematic drawing showing a sliding surface of a sliding bearing, on which crystallized Mn—Si compounds are dispersed in a copper alloy matrix.
Figure 2:
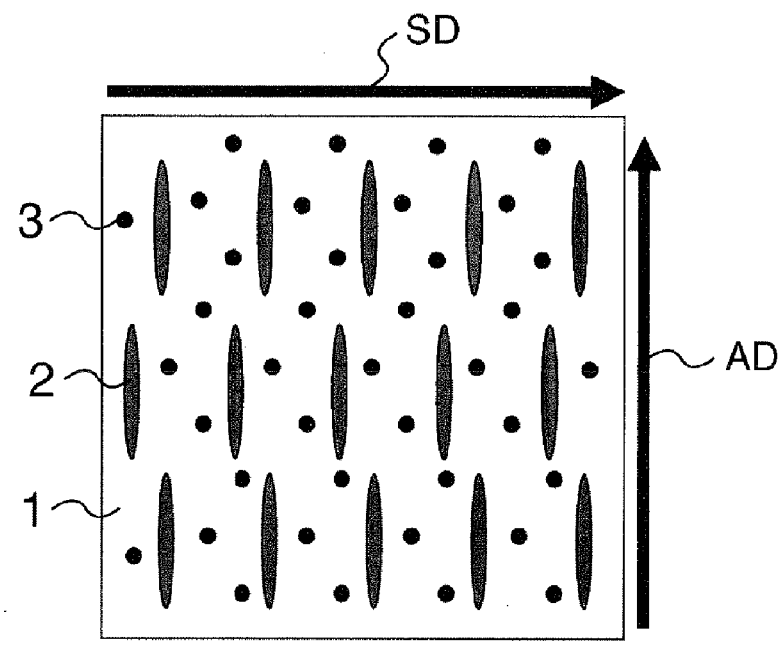
FIG. 2 is a schematic drawing showing a sliding surface of a sliding bearing, on which crystallized Mn—Si compounds and precipitated Mn—Si compounds are dispersed in the copper alloy matrix.

Invention specimens A to F and comparative specimens A to C made of copper alloys, in which Mn—Si compounds are dispersed, were prepared for the purpose of measuring the average inter-grain distance of the Mn—Si compounds, an evaluation of a sulfide film formation and a seizure test. Table 1 shows chemical compositions of the invention specimens A to F and the comparative specimens A to C. For each of the invention specimens A to F and the comparative specimens A to C, a copper alloy shown in Table 1 was cast, and the thus obtained casting was subjected to hot extrusion to produce a cylindrical sliding bearing. When casting, Mn—Si compounds were crystallized in the copper alloy matrix. The cast copper alloy was subjected to hot extrusion and then arranged in such a manner that the crystallized Mn—Si compounds extend in an axial direction of a mating shaft on a sliding surface of the sliding bearing. Further, control was made in such a manner that the average inter-grain distance of the Mn—Si compounds dispersed in the copper alloy matrix on the sliding surface of the sliding bearing matches the distance shown in Table 1 by changing the casting conditions for making the cast copper alloy and the hot extruding conditions.

ing conditions. It was experimentally confirmed that when the invention specimens A to F were cast of an alloy comprising 25 to 45% by mass of Zn, control was able to be made so that the average inter-grain distance of the crystallized Mn—Si compounds fell within a range of 20 to 80 μm.

The invention specimens D and E had the same alloy composition as that of the invention specimens A and C respectively except that control was made such that the cooling rate of the molten copper alloy was increased more than that of the invention specimens A to C, a part of the Mn and Si contained in the copper alloy was changed into an oversaturated solid solution in the copper alloy matrix without being crystallized as the Mn—Si compounds, thereby not only the crystallized Mn—Si compounds but also the precipitated Mn—Si compounds were dispersed in the copper alloy matrix, and in addition control was made such that the average inter-grain distance of the Mn—Si compounds including the crystallized Mn—Si compounds and the precipitated Mn—Si compounds fell within a range of 5 to 30 μm.

Control was made so that the invention specimen F was cast of an alloy adding Fe, Al, Ni, Sn, Pb and Bi to the invention specimen A and made under the same conditions as those for the invention specimens A to C, and thereby the average inter-grain distance of the crystallized Mn—Si compounds dispersed in the copper alloy matrix fell within a range of 20 to 80 μm. Note that it has been experimentally confirmed that regardless of the elements of the invention specimen F, control was able to be made so that the average inter-grain distance of the crystallized Mn—Si compounds fell within a range of 20 to 80 μm even by adding Cr, Ti, Mo, Co, Zr, and Sb to the copper alloy of the present application.

The comparative specimens A and B had the same alloy composition as that of the invention specimens A and C respectively except that at casting the crystallized Mn—Si compounds were grown larger in order to extremely improve the wear resistance property. As a result, the average inter-grain distance of the crystallized Mn—Si compounds was greater than 80 μm.

The comparative specimen C comprises a less amount of Mn and Si than the invention specimens A to C and thus comprises a less crystallized amount of Mn—Si compound than the invention specimens A to C. As a result, under the same conditions as those for the invention specimens A to C,

TABLE 1

| | Material | Chemical Composition (mass %) | | | | | | | | | Average inter-grain distance (μm) | Whether a sulfide film is present or not | Critical specific load for seizure (MPa) |
| | | Cu | Zn | Mn | Si | Fe | Al | Ni | Sn | Pb | Bi | | | |
|---|---|---|---|---|---|---|---|---|---|---|---|---|---|---|
| Invention Specimen | A | Balance | 35.0 | 3.0 | 1.0 | — | — | — | — | — | — | 50 | YES | 27 |
| | B | Balance | 35.0 | 1.5 | 0.3 | — | — | — | — | — | — | 80 | YES | 21 |
| | C | Balance | 35.0 | 6.0 | 2.0 | — | — | — | — | — | — | 20 | YES | 33 |
| | D | Balance | 35.0 | 3.0 | 1.0 | — | — | — | — | — | — | 15 | YES | 39 |
| | E | Balance | 35.0 | 6.0 | 2.0 | — | — | — | — | — | — | 10 | YES | 42 |
| | F | Balance | 35.0 | 3.0 | 1.0 | 0.1 | 1.0 | 0.05 | 0.05 | 0.03 | 0.8 | 50 | YES | 30 |
| Comparative Specimen | A | Balance | 35.0 | 3.0 | 1.0 | — | — | — | — | — | — | 120 | NO | 9 |
| | B | Balance | 35.0 | 6.0 | 2.0 | — | — | — | — | — | — | 100 | NO | 12 |
| | C | Balance | 35.0 | 1.0 | 0.2 | — | — | — | — | — | — | 130 | NO | 6 |

The invention specimens A to C were formed from the copper alloys comprising 35% Zn, 0.3 to 2.0% Si, 1.5 to 6.0% Mn, and the balance of Cu. Control was made so that the average inter-grain distance of the crystallized Mn—Si compounds dispersed in the copper alloy matrix well within a range of 20 to 80 μm by properly choosing casting and extrudthe average inter-grain distance of the crystallized Mn—Si compounds was greater than 80 μm.

Here, the average inter-grain distance of the Mn—Si compound refers to an average value of the distance between a surface of a grain of a Mn—Si compound dispersed in the copper alloy matrix and a surface of a grain of another Mn—Si compound closest to the grain. An electronic microscope was used to take an image of a composition image of a bearing sliding surface at 200-fold magnification and then from the obtained composition image, the average inter-grain distance was measured by a general image analysis method (analysis software such as: Image-Pro Plus (Version 4.5) manufactured by Planetron, Inc). The measured results were shown in Table 1.

Next, the sliding bearing of each of the invention specimens A to F and the comparative specimens A to C was checked to evaluate whether a sulfide film was formed or not. First, the sliding bearing of each of the invention specimens A to F and the comparative specimens A to C was visually checked to confirm that the sliding surface had a metallic luster (golden color for a brass alloy). Then, a bearing tester was used to perform a sliding test on the sliding bearings of the invention specimens A to F and the comparative specimens A to C under the conditions shown in Table 2. After the sliding test, the sliding surface of each sliding bearing was visually checked to confirm whether or not the sliding surface had a metallic luster to evaluate whether a sulfide film was formed or not. The evaluation was made in such a manner that when the entire sliding surface of the sliding bearing after the sliding test lost a metallic luster, a determination was made that a sulfide film was "YES", and when a part of the sliding surface had a metallic luster, a determination was made that a sulfide film was "NO". The evaluation results were shown in Table 1.

TABLE 2

| Testing method | Bushing test |
| --- | --- |
| Inner diameter of sliding bearing | 20 mm |
| Peripheral speed | 10 m/second |
| Load | 1 Mpa |
| Lubricant oil | Engine oil |
| Temperature of lubricant oil | 150° C. |
| Testing time | One hour |

For each of the invention specimens A to F, a uniform sulfide film was formed on each surface of the copper alloy matrix of the sliding surface of the sliding bearing, while for each of the comparative specimens A to C, most of the sliding surfaces had a metallic luster and no sulfide film was formed on the entire surface of the copper alloy matrix on the sliding surface of the sliding bearing. Here, the invention specimens A to C, and F were configured such that the average inter-grain distance of the crystallized Mn—Si compounds dispersed in the copper alloy matrix fell within a range of 20 to 80 μm, while the invention specimens D and E were configured such that the average inter-grain distance of the Mn—Si compounds including the crystallized Mn—Si compounds and the precipitated Mn—Si compounds dispersed in the copper alloy matrix fell within a range of 5 to 30 μm. Therefore, the entire copper alloy matrix on the sliding surface of the sliding bearing was affected by the difference in thermal expansion between the copper alloy matrix and the Mn—Si compound. Therefore, the copper alloy matrix is uniformly active and a uniform sulfide film was formed on the surface of the copper alloy matrix.

In contrast to this, the comparative specimens A to C were configured such that the average inter-grain distance of the crystallized Mn—Si compounds dispersed in the copper alloy matrix exceeded 80 μm, and thus the copper alloy matrix near the central portion between Mn—Si compound grains was unlikely to be affected by the difference in thermal expansion between the copper alloy matrix and the Mn—Si compound. Thus, no uniform sulfide film was formed on the surface of the copper alloy matrix.

Next, a bearing tester was used to perform a seizure test on each sliding bearing of the invention specimens A to F and the comparative specimens A to C under the conditions shown in Table 3. Note that when the backing temperature of the sliding bearing was 250° C., a determination was made that a seizure occurred. The limit loads (surface pressures) at which no seizure occurred were shown in Table 1.

TABLE 3

| Testing method | Bushing test |
| --- | --- |
| Inner diameter of sliding bearing | 20 mm |
| Peripheral speed | 10 m/second |
| Load | Each increment of load: 3 MPa/10 min. |
| Lubricant oil | Engine oil |
| Temperature of lubricant oil | 100° C. |

When an evaluation was made as to whether a sulfide film was formed or not, the invention specimens A to F in which a sulfide film was formed early on a surface of the copper alloy matrix on the sliding surface of the sliding bearing had a high anti-seizure property, while the comparative specimens A to C in which a sulfide film was not early formed had a low anti-seizure property. This is because the invention specimens A to F had a nonmetal sulfide film which was formed early on the surface of the copper alloy matrix on the sliding surface of the sliding bearing and which prevented sliding of the metal surfaces between the sliding surface and the mating shaft surface. Further, the invention specimens D and E were such that not only crystallized Mn—Si compounds but also precipitated Mn—Si compounds were dispersed in the copper alloy matrix, and thereby the average inter-grain distance of the Mn—Si compounds including the crystallized Mn—Si compounds and the precipitated Mn—Si compounds was reduced and a sulfide film was formed earlier. That was considered to cause a particularly high anti-seizure property.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sliding bearing used in turbochargers of internal combustion engines, which is formed with a copper alloy comprising, by mass %, 25 to 45% Zn, 0.3 to 2.0% Si, 1.5 to 6.0% Mn, and the balance being Cu and unavoidable impurities, and which has a cylindrical shape for supporting a rotating shaft, wherein crystallized Mn—Si compounds, which extend in an axial direction of the rotating shaft on a sliding surface of the sliding bearing, are dispersed in a matrix of the copper alloy, and wherein the crystallized Mn—Si compounds have an average inter-grain distance of 20 to 80 μm.

2. The sliding bearing according to claim 1, wherein the copper alloy further comprises at least one element selected from the group consisting of Pb and Bi.

3. The sliding bearing according to claim 1, wherein the copper alloy further comprises, by mass %, at least one element selected from the group consisting of Fe, Al, Ni, Sn, Cr, Ti, Mo, Co, Zr and Sb in a total amount of not more than 5%.

4. The sliding bearing according to claim 3, wherein the copper alloy further comprises at least one element selected from the group consisting of Pb and Bi.

5. The sliding bearing according to claim 1, wherein the matrix of the copper alloy contains not only the crystallized Mn—Si compounds but also precipitated Mn—Si compounds which are dispersed in the matrix, and the Mn—Si compounds including the crystallized Mn—Si compounds and the precipitated Mn—Si compounds have an average inter-grain distance of 5 to 30 μm.

6. The sliding bearing according to claim 5, wherein the copper alloy further comprises at least one element selected from the group consisting of Pb and Bi.

7. The sliding bearing according to claim 5, wherein the copper alloy further comprises, by mass %, at least one element selected from the group consisting of Fe, Al, Ni, Sn, Cr, Ti, Mo, Co, Zr and Sb in a total amount of not more than 5%.

8. The sliding bearing according to claim 7, wherein the copper alloy further comprises at least one element selected from the group consisting of Pb and Bi.

* * * * *